March 13, 1945.  C. W. GOODWIN ET AL  2,371,581
FORMING PRESS
Original Filed April 26, 1941  7 Sheets-Sheet 2
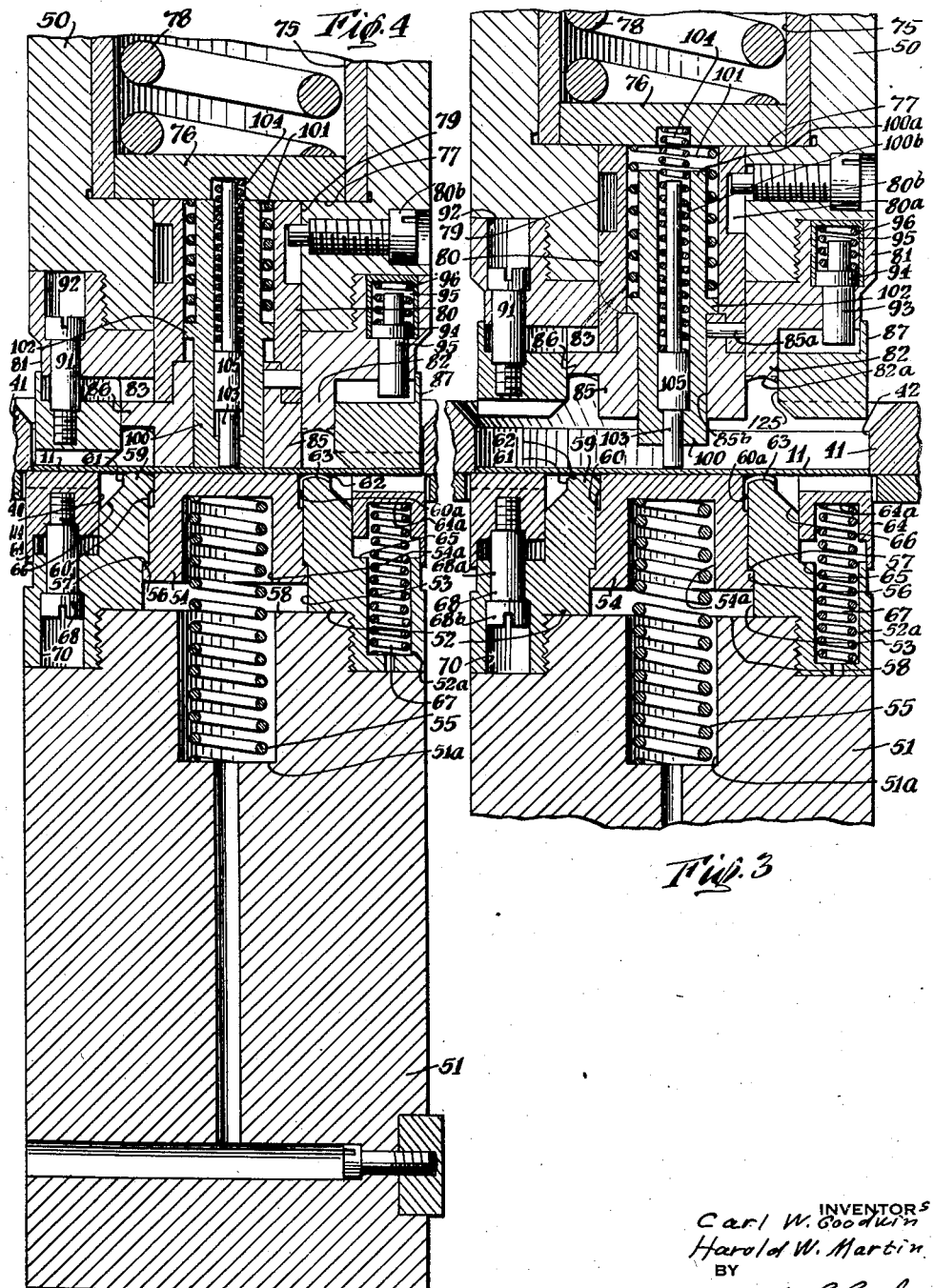
INVENTORS
Carl W. Goodwin
Harold W. Martin
BY
ATTORNEY March 13, 1945.  C. W. GOODWIN ET AL  2,371,581
FORMING PRESS
Original Filed April 26, 1941   7 Sheets-Sheet 3
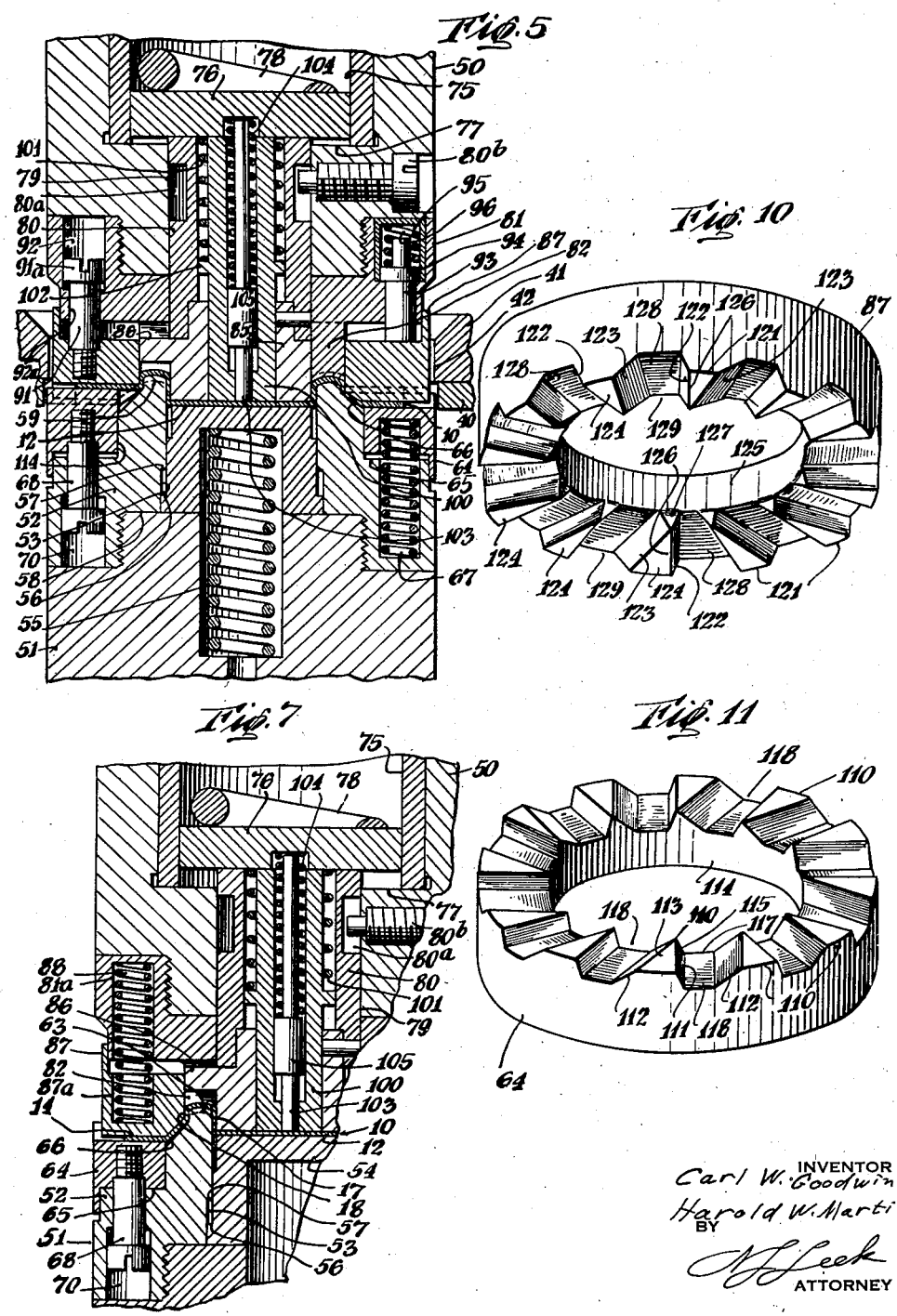

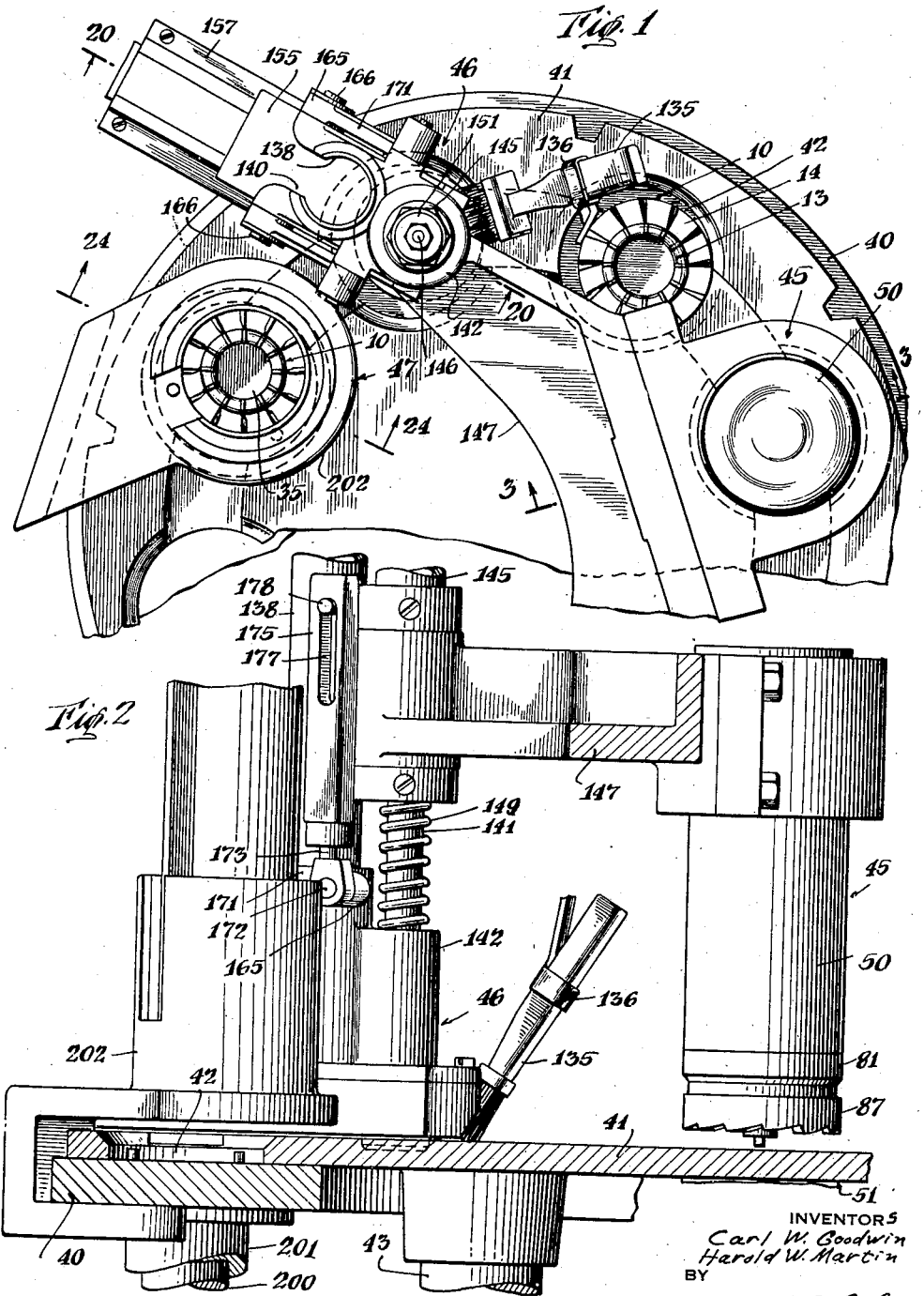

March 13, 1945.   C. W. GOODWIN ET AL   2,371,581
FORMING PRESS
Original Filed April 26, 1941   7 Sheets-Sheet 4
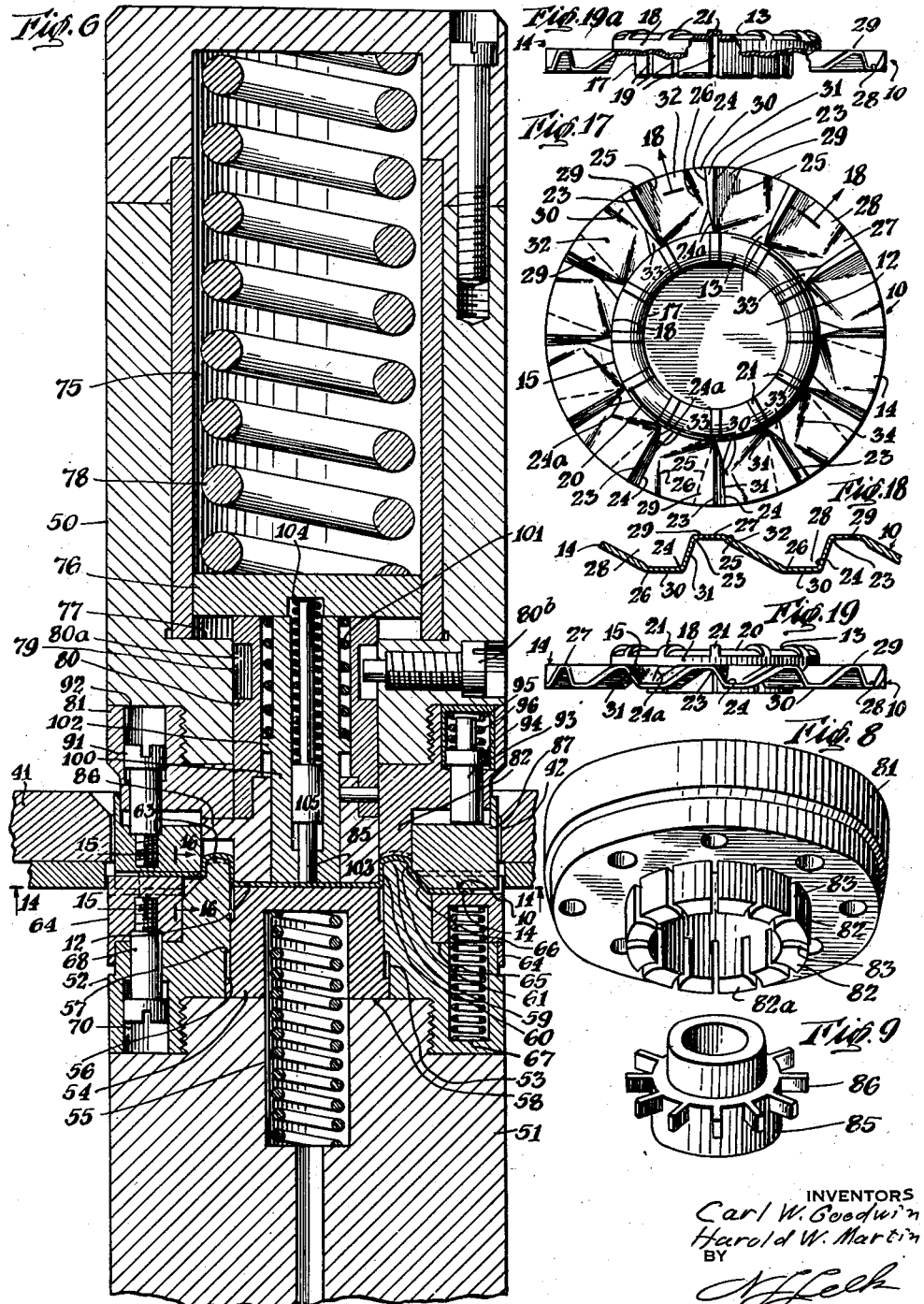
INVENTORS
Carl W. Goodwin
Harold W. Martin
BY
ATTORNEY March 13, 1945.    C. W. GOODWIN ET AL    2,371,581
FORMING PRESS
Original Filed April 26, 1941    7 Sheets-Sheet 5
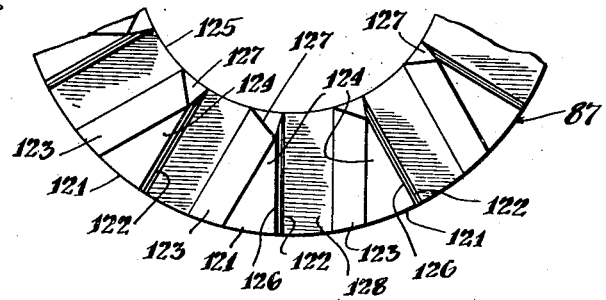
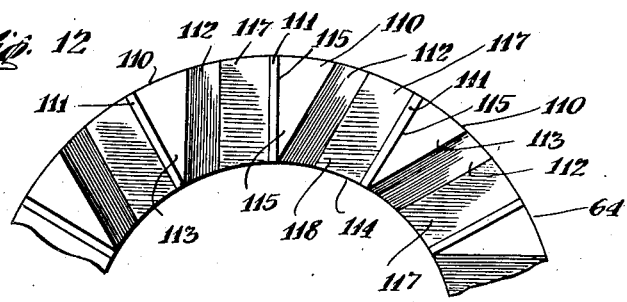
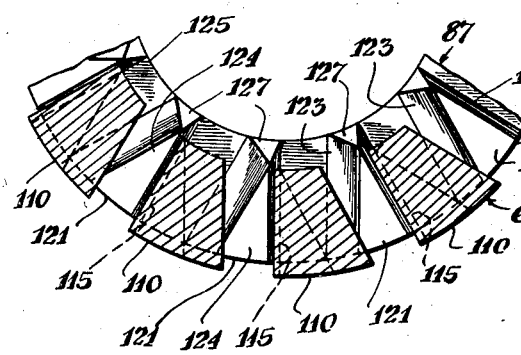
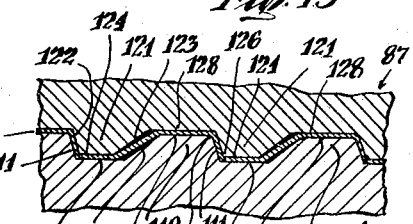
INVENTORS
Carl W. Goodwin
Harold W. Martin
BY
ATTORNEY

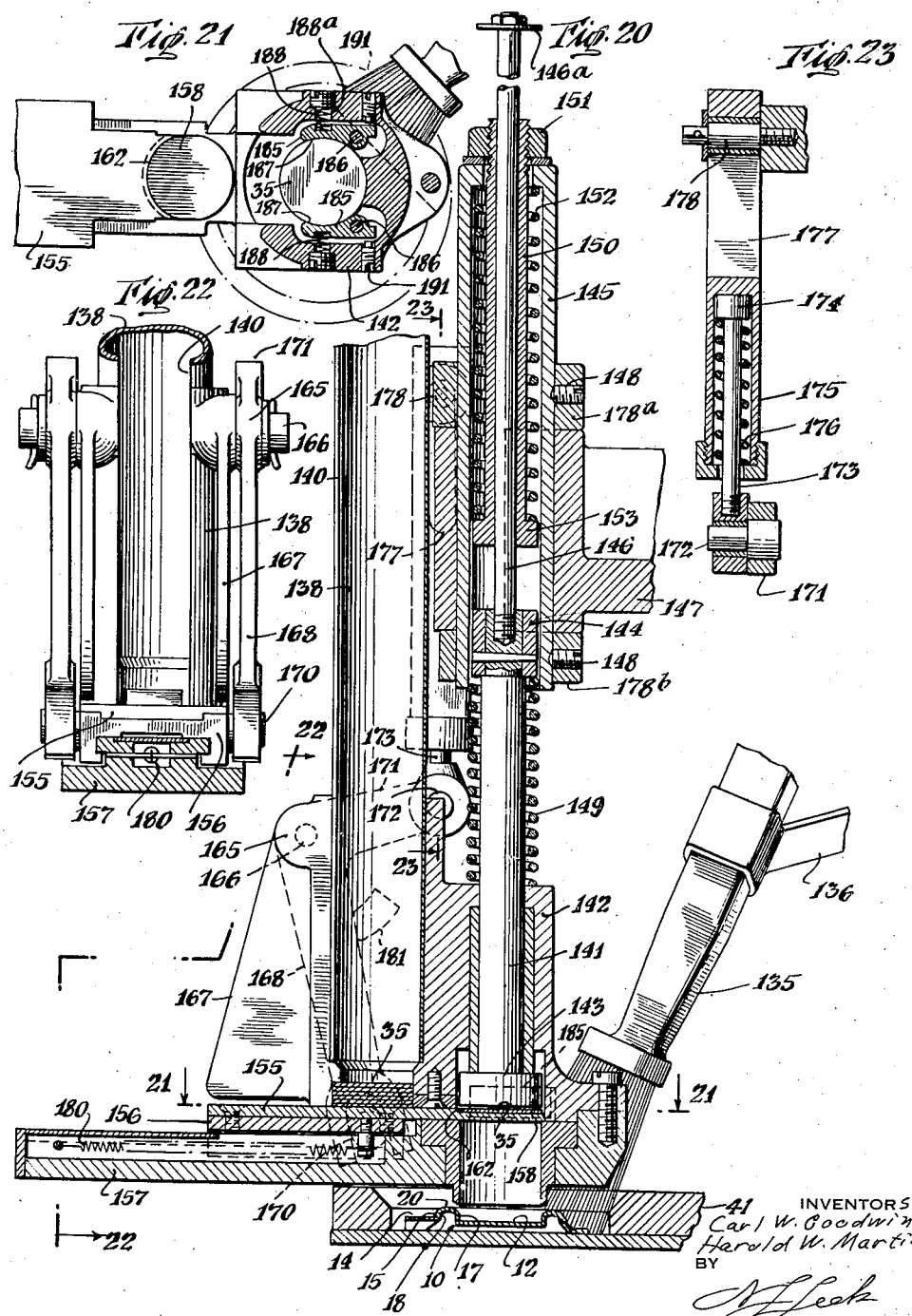

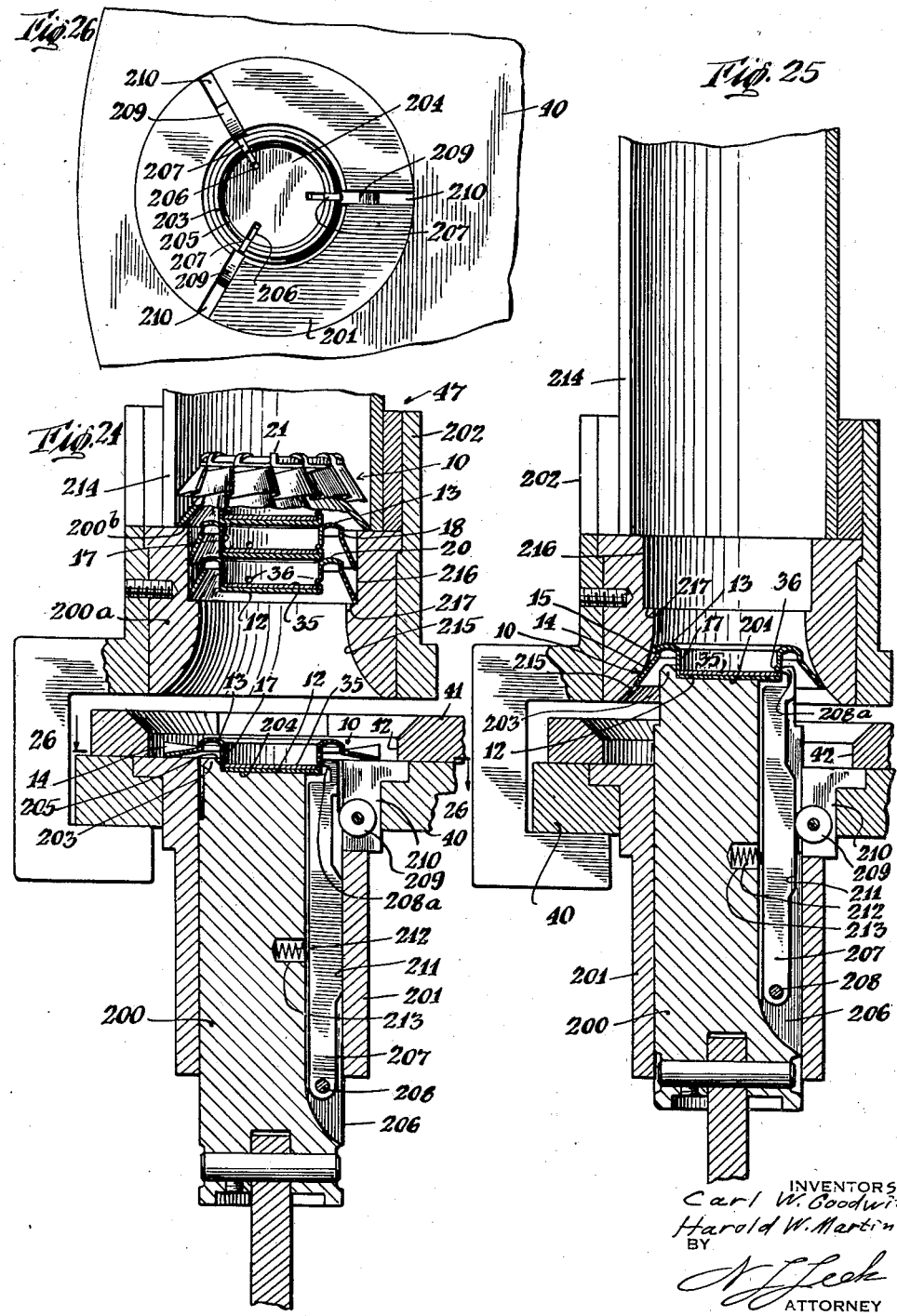

Patented Mar. 13, 1945

2,371,581

UNITED STATES PATENT OFFICE 2,371,581

FORMING PRESS

Carl W. Goodwin, North Plainfield, N. J., and Harold W. Martin, Malverne, N. Y., assignors to American Seal-Kap Corporation of Delaware, Wilmington, Del., a corporation of Delaware Original application April 26, 1941, Serial No. 390,468. Divided and this application April 30, 1942, Serial No. 441,094

1 Claim. (Cl. 93—1.3)

The present invention relates to hood caps, and to a process and apparatus for making and stacking the same.

This application is a division of our co-pending application, Ser. No. 390,468, filed April 26, 1941.

One object of the present invention is to provide a hood cap having new and improved characteristics.

Another object is to provide a new and improved hood cap of the general type referred to, which may be readily and effectively sealed onto a container such as a milk bottle.

Another object is to provide a new and improved hood cap having a skirt, which is creased, shaped and constructed to permit its easy, neat and effective shaping and sealing over the head of a bottle.

Another object is to provide a new and improved creasing and forming die for the skirt portion of the cap.

Another object is to provide a new and improved mechanism for shaping and forming hood caps from flat disc blanks.

Another object is to provide a new and improved mechanism for feeding and seating a reinforcing disc onto the reentrant or depressed diaphragm of a flexible preformed cap.

Another object is to provide a new and improved mechanism for locking a reinforcing disc in seating position onto the depressed diaphragm of a preformed cap.

Another object is to provide a new and improved means for stacking the preformed caps.

Another object is to provide means whereby disc locking and cap stacking operations are performed simultaneously at the same station.

Another object is to provide a new and improved method for making a flexible hood skirted cap.

Various other objects and advantages of the invention will be apparent from the following particular description and from an inspection of the accompanying drawings, in which Fig. 1 is a fragmentary top plan view of a hood cap forming press embodying the present invention.

Fig. 2 is a fragmentary vertical section of the cap forming mechanism of the machine shown in Fig. 1.

Fig. 3 is a section taken on line 3—3 of Fig. 1, showing the cap forming die in initial position before shaping the blank.

Fig. 4 is a section similar to that of Fig. 3, showing the cap forming die just before the start of the shaping operation.

Fig. 5 is a section similar to that of Fig. 3, showing the cap forming die at a later stage in the shaping operation.

Fig. 6 is a section similar to that of Fig. 3, showing the forming die at the end of the shaping operation.

Fig. 7 is a vertical fragmentary section of the forming die, taken on a radial plane different from that of Fig. 6.

Fig. 8 is a perspective of the upper corrugation ring, which forms the pouring lip housing of the cap.

Fig. 9 is a perspective of the wiper for the slots in the upper corrugation ring.

Fig. 10 is a perspective of the upper skirt creasing ring.

Fig. 11 is a perspective of the lower skirt creasing ring.

Fig. 12 is a fragmentary top plan view of an enlarged scale of the lower creasing ring.

Fig. 13 is a fragmentary bottom plan view on an enlarged scale of the upper skirt creasing ring.

Figs. 14, 15 and 16 are sections through the interengaging teeth of the two skirt creasing rings, taken on lines 14—14, 15—15 and 16—16 of Fig. 6 respectively.

Fig. 17 is a top plan view of the hood cap made by the forming die shown in Figs. 1–16.

Fig. 18 is a section of the cap taken on line 18—18 of Fig. 17.

Fig. 19 is a side elevation of the hood cap shown in Fig. 17.

Fig. 19a is a side elevation of the hood cap, with parts broken away to show the vent grooves.

Fig. 20 is a vertical section of the disc feed mechanism taken on line 20—20 of Fig. 1.

Figs. 21, 22 and 23 are sections taken on lines 21—21, 22—22 and 23—23 respectively of Fig. 20.

Fig. 24 is a vertical section of the stacking and disc locking mechanism, taken on line 24—24 of Fig. 1, and shown in initial operating position.

Fig. 25 is a section of the stacking mechanism similar to that of Fig. 24, but showing said mechanism in the process of locking the disc in position in the cap; and Fig. 26 is a horizontal section of the stacking mechanism taken on line 26—26 of Fig. 24.

Referring to the drawings, the preformed hood cap 10 (Figs. 17 to 19a) is made from a disc blank 11 (Figs. 3 and 4) of suitable flexible material such as paper, having form sustaining rigidity to permit creasing and shaping. The cap 10 is creased and shaped to provide a depressed central bore closing diaphragm 12 (Fig. 17) adapted to enter snugly into the mouth of a bottle, such as the conventional milk bottle, and to seat on an internal ledge thereof, an annular pouring lip housing 13 of channel shaped cross-section adapted to extend over the pouring lip of the bottle, and an outwardly extending fluted skirt 14, adapted to be contracted around the beaded lip of the bottle, and separated from said housing by an annular sharp crease line 15 along which said skirt is bent.

The pouring lip housing 13 has a pair of parallel side walls 17 and 18, and a top wall 20, bridging said side walls, and formed with raised radial ribs or corrugations 21 serving as reinforcements for said top wall. The inner side housing wall 17 is provided with a series of vent grooves 19, to permit venting of the bottle in response to expansion of the contents thereof. The two side walls 17 and 18 may be skived to iron or smooth out any irregularities in the surfaces thereof.

The skirt 14 is creased sharply along substantially radial lines 23 and 24, and bluntly along lines 25 and 26, and is offset along these lines to form alternate ridges 27, and furrows 28. Each adjoining pair of crease lines 23 and 25 define therebetween a flat triangular ridge top 29, with its apex near the annular crease line 15, and each adjoining pair of crease lines 24 and 26 define therebetween a flat triangular furrow base 30 with its apex near said annular crease line 15. These triangular skirt sections 29 and 30 extend substantially at right angles to the axis of the cap.

The side 31 of each ridge 27 extends steeply downwardly between adjoining pairs of sharp crease lines 23 and 24, while the other side 32 extends downwardly with a lesser slope towards the triangular base 30, to meet the respective blunt fold line 26. The lower crease line 24 is offset at its radially inner end 24a to meet the upper crease line 23, so that the ridge sides 31 between lines 23, 24 and 24a in conjunction with the ridge top section 29 constitute the surplus pleat forming material of the skirt when contracted and pressed over a bottle head.

After the cap is made into the shape shown in Figs. 17 to 19a, its skirt 14 is partially contracted along the crease lines 23, 24 and 24a, as shown in Figs. 24 and 25, to permit nesting and stacking of the caps. This partially contracted cap is then finally contracted over the bottle head to form substantially triangular overlapping pleats diverging from the housing 13. The overlapping layers of these pleats may be secured together by a suitable adhesive.

The partial contraction of the cap is effected by forcing said cap, while in the shape shown in Figs. 17 to 19a, through a tubular member with a flaring mouth opening, as will be fully described hereinafter. During this forcing action, the skirt sliding over the flaring surface of the opening is partially contracted. In order to present a bearing surface of substantial area on the skirt to effectively withstand the contracting force, the top skirt portions 29 are flat and extend substantially at right angles to the axis of the cap. Furthermore, these skirt portions 29 are compressed to stiffen the material of said portions, so that they can be effectively and easily subjected to bearing action without undesirable distortion of the cap.

The bottom skirt portions 30 are also flat, and extend at right angles to the axis of the cap to afford, a bearing surface of substantial area when the partially contracted cap is finally secured to the bottle head during capping operations. These skirt portions 30 are furthermore compressed to stiffen the material thereof, so that they will be more effective as bearing surfaces during this capping action.

The skirt portions 31 are also compressed or skived to render the material thereof rigid, so that these portions do not buckle during the partial contracting operation described, and the skirt will fold very neatly along their predetermined crease lines 23, 24 and 24a.

The skiving or compressing of the portions 29, 30 and 31 also reduces their thickness, so that when they overlap, the aggregate thickness of the pleat layers is somewhat reduced. This compressing of the skirt portions 29, 30 and 31 also serves to form the blunt fold lines 25 and 26, and the alternate ridge 27 and furrows 28.

In order to prevent bunching of the surplus material of the contracted skirt 14 around the apices of the pleats, said skirt is skived or pressed at triangular sections 33 near said apices as shown in Fig. 17, to reduce the thickness of said sections. This skiving at the sections 33 also accentuates the crease lines 24a, and thereby facilitates the folding of the skirt into pleats when said skirt is contracted.

The cap skirt 14 is also bent bluntly along lines 34 extending from the radial inner end of each crease line 23, diagonally towards the side 31 of the adjacent ridge 27, to ease the contracting movement of the skirt along its predetermined crease lines during capping operations.

The cap 10 may be coated in whole or in part with a suitable adhesive such as a thermoplastic adhesive or a solvent softening adhesive. This adhesive is preferably applied to the disc blank 11 before the capping operation, but may be applied after the cap has been preformed into the shape described.

A disc 35, as shown in Figs. 24 to 26, is seated on the diaphragm 12 to carry the necessary printing, to reinforce said diaphragm, and to exert sealing pressure against the internal wall of the bottle. This disc 35 is locked in position by inward projections 36, indented from the inner housing wall 17, and overlying said disc.

The machine for making the preformed caps above described comprises a fixed dial bed 40, and a dial plate 41, seated on said dial bed, and having a series of circularly arranged holes 42 for receiving cap blanks 11 and moving them successively, step by step from one operating station to the next. This step-by-step rotation of the dial plate 41 may be effected by any suitable means well known in the art, for example from a shaft 43, secured to said dial plate as shown in Fig. 2.

The cap blanks 11 are fed successively into respective dial plate holes 42 by suitable means (not shown) as the dial plate 41 is rotated past a blank feed station, and are advanced thereby to a forming station 45, where said blanks are shaped into the form described. The shaped cap is then advanced by the dial plate 41 to a disc feed station 46, where the reinforcing disc 35 is fed and seated onto the cap diaphragm 12. Finally the cap with the attached disc 35 is advanced by the dial plate 41 to a stacking and disc locking station 47, where the disc 35 is permanently secured in the cap and the completed caps are stacked preparatory to their removal from the machine.

*Cap forming mechanism*

The cap forming mechanism at the station 45 (Figs. 3 to 16) comprises an upper thrust ram 50, vertically reciprocated by suitable power means (not shown) towards and away from a fixed press bed 51. Threaded or otherwise secured to this press bed 51 is a lower corrugation ring 52, having a central bore 53 for slidably receiving a lower diaphragm plunger 54, which is urged axially upwardly by a central coil spring 55 seated in bores 54a and 51a in the plunger 54 and the bed 51 respectively.

Annular facing shoulders 56 and 57 on plunger 54 and the corrugation ring 52 respectively, limit upward movement of said plunger in position shown in Fig. 3, while the downward movement is limited by the top surface 58 of the press bed 51.

The corrugation ring 52 is provided with an annular boss 59 having vertical inner and outer side walls 60 and 61 respectively, and a top wall 62. The top wall 62 carries a series of narrow radial ribs 63, while the inner wall 60 carries spaced ribs 60a extending lengthwise thereof to form the vent grooves 19 on the cap housing wall 17.

The corrugation ring 52 slidably carries a lower skirt creasing ring 64, and is provided with an upwardly facing annular shoulder 65 which limits the downward movement of said creasing ring 64. The corrugation ring 52 is also provided with a bevelled surface 66 between the outer vertical wall 61 and the inner periphery of the creasing ring 64, for the purpose to be described.

The lower creasing ring 64 is urged upwardly by a series of coil springs 67 seated in bores 64a and 52a in the creasing ring 64 and the corrugation ring 52 respectively. The upward movement of the creasing ring 64 is guided by a plurality of studs 68, threaded into the creasing ring 64, and slidable in holes 68a in the corrugation ring 52. The studs 68 are provided with heads 68b, slidable in recesses 70 in the corrugation ring 52, the ends of which form stops for limiting the upward spring actuated movement of the creasing ring 64.

The ram 50, shown in the form of a cylinder, has a central bore 75, in which is slidably fitted a piston 76, urged into downward limiting position against a shoulder 77 of the ram 50 by a strong coil spring 78. The ram 50 has a central bore 79 extending downwardly from the bore 75. In the bore 79 is slidably mounted a sleeve 80 having its upper end engaging the piston 76, and its lower end attached by a pin 85a to an upper diaphragm plunger 85. The sleeve 80 is provided with a peripheral groove 80a, into which extend a plurality of stops, shown as screws 80b threaded in the ram 50.

An upper corrugation ring 81 is threaded or otherwise secured to the ram 50, and is provided with a flange 82 having a curved lower surface 82a suited to form the top of the pouring lip housing of the cap, and having a set of radial grooves 83 cooperating with the ribs 63 of the lower corrugation ring 52 to form the ribs 21 on the pouring lip housing of the cap.

In order to maintain the rib forming grooves 83 free from lint or other foreign matter, the diaphragm plunger 85 is provided with radial spokes 86, which slide vertically in said grooves 83 during the reciprocation of said plunger in the bore 79 of the ram 50.

Slidably mounted over the flange 82 of the upper corrugation ring 81 is an upper skirt creasing ring 87, cooperating with the lower creasing ring 64 to form the cap skirt, and urged downwardly by a series of coil springs 88 (Fig. 7), which are seated in bores 81a and 87a in the corrugation ring 81 and the creasing ring 87 respectively. The downward movement of the upper creasing ring 87 is limited by a plurality of studs 91, threaded in said ring, and slidably mounted in holes 92a in the upper corrugation ring 81. The studs 91 are provided with heads 91a sliding in recesses 92 in the upper corrugation ring 81 to limit the downward movement of the upper creasing ring 87.

A plurality of plungers 93 are slidable in chambers 95 of the upper corrugation ring 81. These plungers 93 are urged downwardly by springs 96 seated on flanges 94 of said plungers, which also serve as stops to retain the same in position. These plungers 93 serve to exert an extra downward force on the upper creasing ring 87 near the end of the shaping operation, to thereby assist the skiving or pressing of certain skirt sections of the cap, as will be hereinafter explained.

For stripping the shaped cap from the lower face of the upper diaphragm plunger 85, there is provided an ejector plunger 100, which is axially slidable in a central bore 85b in the diaphragm plunger 85, and which is urged downwardly by a coil spring 101, seated in the sleeve 80 between a flange 102 of said ejector plunger and the piston 76. The plunger 100 is provided with an axial flange 100a which abuts against the piston 76 to limit the movement of the plunger.

For stripping the shaped cap from the face of the ejector plunger 100, an ejector pin 103 is slidably mounted in a bore 100b in the plunger and is urged downwardly by a coil spring 104, seated in said bore between a flange 105 of said pin and the piston 76.

The lower skirt creasing ring 64, shown more fully in Figs. 11, 12 and 14 to 16, is provided with a series of circumferentially arranged teeth 110 with downwardly flaring flanks 111 and 112. Each tooth 110 is formed with a flat triangular crown 113, lying in a plane at right angles to the axis of the ring 64, and having its apex at the inner periphery 114 of the ring. One flank or side 111 of the tooth 110 extends downwardly at a steep angle from a radial edge 115 of the tooth crown 113, while the other tooth flank 112 extends obliquely downwardly at a lesser angle. The base 117 of each interdental groove or space 118 between the adjacent teeth 110 is formed flat and parallel to the tooth crown 113, and substantially rhomboidal in shape.

The upper skirt creasing ring 87, shown more fully in Figs. 10 and 13 to 16, is formed with a series of circumferentially arranged spaced teeth 121, having upwardly flaring flanks 122 and 123. Each tooth 121 is formed with a flat triangular crown 124, lying in a plane at right angles to the axis of the ring 87, with the apex of said crown spaced radially outwardly from the inner periphery 125 of said ring, and one edge 126 of said tooth crown extending substantially radially of the ring. The section 127 of the ring 87, between the crown apex and the inner ring periphery 125, is bevelled and of triangular shape for skiving or pressing the triangular cap sections 33, as will be more fully described.

The side 122 of each tooth 121 extends steeply upwardly towards the base 128 of the corresponding interdental groove or space 129, while the other side 123 extends obliquely upwardly with a lesser slope. This groove base 128 is formed flat and parallel to the tooth crown 124 and substantially rhomboidal in shape.

The two creasing rings 64 and 87 are circumferentially arranged, so that during the shaping operations when the two rings are relatively moved axially into skirt shaping mesh, the teeth 121 of the upper ring will extend into respective interdental spaces 118 of the lower ring 64, while the teeth 110 of the lower ring will extend into respective interdental spaces 129 of the upper ring. During this relative shaping movement of the creasing rings 64 and 87, the steep side 111 of each lower tooth 110 moves relatively close to the steep side 122 of the upper corresponding tooth 121 to skive the portion of the cap blank between said sides, and thereby form the steep thinned sides 31 (Figs. 17 to 19) of the skirt ridges. At the same time the flat triangular crown 113 of the lower creasing ring 64 moves relatively against the flat substantially rhomboidal base 128 of the groove 129 of the upper ring 87 to press the cap blank between said crown and said base and thereby press and thin out said blank over the triangular crown sections 29. In this shaping position of the creasing rings 64 and 87, the flat triangular crown 124 of the upper ring tooth 121 will be pressing against the flat rhomboidal base 117 of the lower interdental groove 118, and will thereby compress the cap blank to form the thin, highly compressed triangular base section 30 of the cap skirt. At the same time the blank will be sharply creased to form the sharp crease lines 23 and 24 of the cap, while the triangular bevelled tooth sections 127 of the upper ring 87, pressing against the bevelled surface 66 of the lower corrugation ring 52 forms the skived or compressed triangular cap sections 33, and also the crease lines 24a.

It is seen that the skirt portion of the cap blank is pressed only at those sections where the sharp crease lines 23, 24 and 24a, and the triangular skived sections 29, 30 and 31 are formed.

*Operation of forming mechanism*

In the operation of the forming mechanism, the dial plate 41 stops intermittently in position to seat a cap blank 11 on the lower diaphragm plunger 54 and on the lower rings 52 and 64, while the ram 50 is in elevated position as shown in Fig. 3. The ram 50 is then moved downwardly to first cause retraction of the ejector pin 103 upwardly and inwardly into the downwardly moving ejector plunger 100, and then subsequent retraction of said plunger 100 upwardly and inwardly into the downwardly moving sleeve 80, until these plungers 85 and 100 are stopped by the piston 76 and seat with their lower surfaces flush on the cap blank 11, as shown in Fig. 4.

During this downward movement of the ram 50, the upper skirt creasing ring 87 is carried downwardly until it engages the cap blank 11. The continued downwardly movement of the ram 50 causes entry of the upper diaphragm plunger 85 into the bore 53 of the lower corrugation ring 52 against the pressure of the yielding spring-pressed lower diaphragm plunger 54 until the plunger 54 seats on the base 51, thereby depressing the blank 11 to form the reentrant diaphragm 12. At the same time the upper corrugation ring 81, pressing against the lower corrugation ring 52, shapes the ribbed pouring lip housing 13 of the cap, and the upper creasing ring 87 pressing against the lower creasing ring 64 moves said ring 64 downwardly and shapes the flutings on the cap skirt.

During this operation, the inner periphery 125 of the upper creasing ring 87, moving opposite and close to the outer cylindrical periphery 61 of the boss 59 of the lower corrugation ring 52, skives the portion of the cap blank between said surfaces to form the skived outer wall 18 of the cap housing 13.

When the lower diaphragm plunger 54 reaches its lowermost limiting position shown in Fig. 5, the lower skirt creasing ring 64 is still above its lowermost limiting position. The downward movement of the ram 50 is continued after the lower diaphragm plunger 54 reaches its limiting position, this continued movement of the ram causing the piston 76 to be moved upwardly against the action of the spring 78, whereby relative movement between the upper diaphragm plunger 85 and the ram 50 is permitted. Continued downward movement of the ram 50 then imparts a final downward pressure movement to the creasing ring 87 aided by the spring-pressed pins or plungers 93, which come into action at this phase to effect the final skiving and pressing operations on the skirt.

After the shaping operation has been completed, the ram 50 is moved upwardly until the bottom 77 of the bore 75 reaches the piston 76. The upper diaphragm plunger 85 then moves with the ram 50, and thereby permits the lower diaphragm plunger 54 to move upwardly under the action of the spring 55, and to eject the shaped cap from the bore 53 of the lower corrugation ring 52. As the upward movement of the ram 50 is continued, the ejector plunger 100 projects downwardly beyond the lower face of the upper diaphragm plunger 85 under the action of the coil spring 101, to strip the shaped cap from said face, and the ejector pin 103 projects downwardly beyond the lower face of said ejector plunger under the action of the coil spring 104 to strip said cap from said latter face.

*Disc feed mechanism*

After the cap has been shaped into the form shown in Figs. 17 to 19 and ejected as described, the dial plate 41 is rotated to move said cap to the disc feed station 46. The dial plate holes 42 are large enough to snugly receive the cap blanks 11, but after the snaping operation described, the diameter of the shaped cap will be much less than that of the blank, so that said shaped cap will have a great deal of play in its dial plate hole.

In order to properly center the shaped cap with respect to the disc feeding mechanism, there is provided a brush 135 (Figs. 1, 2 and 20), supported in a fixed inclined position by any suitable means, shown as a bracket 136, and acting over the surface of the rotating dial plate 41 to brush and hold the cap into eccentric tangential contact with one side of the dial plate hole 42, so that when said dial plate 41 stops for the next operation, said cap will be properly positioned with respect to said disc feed mechanism.

The disc feeding mechanism shown in Figs. 20 to 23 comprises a vertical magazine tube 138, having a slot 140 extending lengthwise thereof, and wide enough to permit the entry of the operator's fingers therethrough when placing a stack of discs 35 in said tube. Alongside of the magazine 138 is a disc seating plunger 141, disposed in alignment with the cap as positioned by the brush 135, and slidable in a stationary bracket 142. The lower end of the plunger 141 is provided with a head 143 of substantially the same diameter as the disc 35. The upper end of the plunger 141 has secured thereto a head 144, which is slidable in a housing 145, a contact rod 146 being threaded or otherwise secured to the plunger 141 and extending upwardly through the housing 145. A coil spring 149, seated between the bracket 142, and the head 144, urges the disc seating plunger 141 upwardly out of the path of reciprocating movement of a feed plate 155 to be described.

The upper end of the rod 146 projecting upwardly beyond the upper end of housing 145, carries a contact disc 146a. In the absence of a disc at the disc feeding station, the rod 146 will descend to a position in which the contact disc 146a will open a switch (not shown) to shut off the drive motor (not shown) and thereby shut down the machine.

The housing 145 is secured by collars 178a and 178b and set screws 148 to a yoke 147, fixed to the ram 50 for reciprocation therewith. A sleeve 150 sliding in the housing 145 loosely embraces the rod 146. The sleeve 150 carries a spring 152 seated between the top wall of the housing 145 and a head 153 formed at the lower end of said sleeve. A nut 151 is shown as threaded onto the projecting end of the sleeve 150 to limit the downward movement thereof.

For feeding the discs 35 successively from the magazine 138 to the line of movement of the plunger 141, there is provided a feed plate 155 which is slidable underneath the lower discharge end of said magazine, and which is secured for that purpose to a slide 156 movable along a guide 157. This feed plate 155 has a forward depressed disc supporting section 158 substantially coextensive with a disc 35 and depressed by at least the thickness of a disc 35, to form a circular shoulder 162, suited to engage the edge of a disc 35. The shoulder 162 may be bevelled rearwardly or undercut to frictionally grip a disc as the feed plate 155 is moved forwardly.

For reciprocating the slide 156 along its guide 157, there are provided a pair of opposed cranks 165, pivotally supported at 166 on stationary brackets 167, and having arms 168, which flank the slide 156 and are bifurcated to engage pins 170 on the sides of said slide.

The other arm 171 of each crank 165 is pivotally connected by a pin 172 to the lower end of a rod 173, which is slidable in a vertical link 175. The rod 173 is urged upwardly relative to the link 175 by a spring 176 engaging a head 174 carried by said rod. A pin 178 carried by the collar 178a extends through an elongated slot 177 in the link 175 to provide a sliding connection between the yoke 147 and the link 175.

A spring 180, fixed at one end to the guide 157, and at the other end to the slide 156, urges said slide with its attached feed plate 155 to the left into disc receiving position under the magazine 138. Stops 181 on the brackets 167 are adapted to engage the crank arms 168 and 171 to limit the movement thereof. At the end of the forward stroke of the feed plate 155, the disc 35 is supported centrally underneath the plunger 141. At the end of its rearward stroke, the disc supporting section 158 of the feed plate 155 will be directly underneath the magazine 138 to receive the bottom disc from the stack in said magazine.

In order to retain the disc 35 underneath the plunger 141 upon withdrawal of the feed plate 155, there are provided a pair of opposed gripping fingers 185, pivotally connected at 186 to the bracket 142, and having circular gripping surfaces 187. These surfaces 187 conform in curvature with the curvature of the discs 35, and are adapted to engage the side edges of the disc 35 on the feed plate 155. These fingers 185 are yieldably urged inwardly towards engagement with the opposed edges of the disc 35 by means of springs 188 at one side of the pivot points 186. The springs 188 may be seated in recesses 188a in the bracket 142. Adjustable screws 191, threaded in the bracket 142, provide stops to limit the movement of the fingers 185.

*Operation of disc feed mechanism*

In the operation of the disc feeding mechanism, a disc 35 is delivered into the position shown in Fig. 20 underneath the plunger 141 when the yoke 147 is in its upward position. As the yoke 147 is moved downwardly by the downward movement of the ram 50, the housing 145 and sleeve 150 move downwardly until the head 153 of the sleeve 150 engages the head 144 of the plunger 141. At the same time, the downward movement of the collar 178a lowers the links 175 and causes pivotal movement of the cranks 165 to thereby retract the slide 156 with the attached feed plate 155 out of the path of the plunger 141. The disc 35, which was fed forwardly on the feed plate 155, is retained in position beneath the plunger 141 by the fingers 185.

When the sleeve 150 reaches the upper end of the plunger 141, the feed plate 155 is fully retracted. Continued downward movement of the housing 145 then compresses the spring 152 and, by the force of said spring, moves the plunger head 143 downwardly against the action of the spring 149 to thereby push the disc 35 downwardly from between the fingers 185 into seating engagement on the diaphragm 12 of the cap 10.

During this continued downward movement of the yoke 147 after the feed plate 153 is fully retracted, the pins 178 slide downwardly in the slots 177 of the links 175 without causing further movement of the cranks 165. The feed plate 155 when thus retracted receives the next disc 35 from the bottom of the stack in the magazine 138.

Upward movement of the yoke 147 first raises the plunger 141 beyond the path of the feed plate 155. When the pins 178 reach the ends of the slots 177 in the links 175, the links are raised, thereby actuating the cranks 165 to advance the feed plate 155. Further movement of the yoke 147 and pins 178, after the feed plate 155 is fully advanced, serves to compress the springs 176 without causing further movement of the cranks 165.

The elongated slot 177 on the housing 175 provides a time interval between the start of the upward movement of the yoke 147, and the start of the movement of the feed plate 155 to the right (Fig. 20), to permit the plunger head 143 to be withdrawn upwardly out of the path of said feed plate. The clearance between the sleeve 150 and the plunger 141 provides a time interval between the start of the retracting movement of the feed plate 155 and the downward movement of the plunger 141 to allow the feed plate to be withdrawn from the path of said plunger.

*Stacker*

After the disc 35 has been seated on the cap diaphragm 12, the dial plate 41 is rotated to advance said cap to the stacking station 47, where said disc is locked onto said diaphragm and the successive caps are stacked. This stacking mechanism shown more fully in Figs. 24 to 26 comprises a plunger 200, which is slidable in a sleeve 201 affixed to and depending from the dial bed 40, and which is operated in proper time sequence with the step by step actuation of the dial plate 41. This plunger 200 is adapted to push the caps upwardly into a vertical magazine tube 202 supported over the dial plate 41 in axial registry with said plunger. The upper end of this plunger 200 is formed with an annular rim 203, registering with the channel defined by the pouring lip housing 13 of the cap, and forming a recess 204 in the top of the plunger for receiving the cap. This rim 203 is shown of V-shaped cross-section, with a bevelled annular surface 205 serving as a guide to center the diaphragm section 12 of the cap on the plunger 200 as said plunger is moved upwardly.

The plunger 200 is provided with a plurality of recesses 206, three being shown, extending axially thereof and receiving respective arms 207. Each arm is pivotally supported at 208 near its lower end in its respective recess 206, and is formed at its upper end with a radially inwardly extending punch finger 208a, adapted to indent the inner housing wall 17 of the cap just above the disc 35 to lock said disc in position. Each arm 207 is cammed into punching position by a roller 209, supported in a recess 210 in the upper section of the sleeve 201, and is formed with a high cam section 211, adapted to ride along said roller during upward movement of the plunger 200. A spring 212 in a recess 213 of the plunger 200 bears against the respective arm 207 to urge it towards the roller 209.

The magazine 202 is formed with a finger slot 214, extending lengthwise thereof to permit removal of the stacked caps from said magazine, and is formed at its lower end with a mouthpiece 200a having a flared mouth opening 215, adapted to partially contract the cap skirts as they are pushed upwardly therethrough, so that the cap is partially folded along its crease lines as shown. This partial contraction of the cap skirt is desirable to facilitate nesting of the stacked caps, and also to facilitate subsequent bottle capping operations during which the skirt is contracted over the bottle head and the overlapping layers of the pleats sealed together.

The flared mouth opening 215 leads into a cylindrical opening 216 in the mouthpiece 200a of larger diameter than the mouth opening and defining a ledge 217 on which the stacked caps rest when they reach a position upwardly beyond said ledge. The upper surface of the mouthpiece 200a also forms a ledge 200b to support the caps in the magazine 202. The magazine is somewhat larger than the opening 216 so as to permit free movement of the caps therein, and to provide space for the skirts which tend to spring back or unfold slightly from their contracted folded position in the opening 216.

*Operation of stacker*

In the operation of the stacking device, as the plunger 200 moves upwardly from the position shown in Figure 24 in proper time sequence with the operation of the dial plate 41, the cap diaphragm 12 is received in the central plunger recess 214, and seated on the bottom of said recess. As the plunger continues its upward movement with the cap seated thereon as described, the cam sections 211 of the arms 207, riding over respective rollers 209, cause the punch fingers 208a to move radially inwardly against the inner housing wall 17 of the cap as shown in Fig. 25. This causes indentation of this wall 17, and forms thereby inward projections 36 directly above the disc 35, so that said disc is locked in position. At the same time, the cap is forced through the flared opening 215, so that the skirt 14 is partially contracted. Due to the shape of the skirt 14 and the creases therein as described, this partial contraction will cause the skirt to fold along its crease lines with the steep ridge side sections 31 of the cap folded inwardly at a reentrant angle, so that the pleat forming sections of the skirt will be more definitely defined.

As the bottom cap is moved upwardly it pushes the stack above it upwardly until this bottom cap reaches a position above the ledge 217. The skirt then expands in the opening 216 and seats on said ledge as the plunger is withdrawn. With the plunger in its upper position the lower part of the arms 207, below the cam sections 211, rides on the respective rollers 209, so that the punching fingers 208a are retracted and the bottom cap is released. The return downward movement of the plunger 200 for the next disc locking and stacking operation can then be effected.

While certain novel features of the invention have been shown and described and are pointed out in the annexed claim, it will be understood that various omissions, substitutions and changes in the forms and details of the machine, process and product illustrated may be made by those skilled in the art without departing from the spirit of the invention.

What is claimed is:

A machine for permanently affixing a disc in seating engagement with the depressed diaphragm of a hood cap having a depressed central diaphragm, a vertical wall extending upwardly therefrom and an outwardly flared creased skirt, and for contracting said skirt, comprising a forming ring having a flared opening to contract said skirt as it is passed therethrough, a plunger in substantial axial alignment with said ring, means for feeding a hood cap with a disc seated on the depressed diaphragm thereof between said ring and said plunger, means for advancing said plunger to feed said hood cap through said flared opening, a plurality of spaced punching members carried by said plunger and spaced around the periphery thereof to engage said outer vertical wall above said disc, said members having fingers to indent said wall, and means actuated by and during the advancing movement of said plunger for contracting said punching members to cause said fingers to indent said wall to form inward projections overlying said disc.

CARL W. GOODWIN.
HAROLD W. MARTIN.